US011255988B2

(12) United States Patent
Moldoveanu et al.

(10) Patent No.: US 11,255,988 B2
(45) Date of Patent: Feb. 22, 2022

(54) ACQUISITION OF ULTRA-LONG OFFSET SEISMIC DATA FOR FULL WAVEFORM INVERSION DURING SEISMIC LAND ACQUISITION

(71) Applicant: WesternGeco LLC, Houston, TX (US)

(72) Inventors: Nicolae Moldoveanu, Houston, TX (US); Maurice Nessim, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 541 days.

(21) Appl. No.: 16/315,918

(22) PCT Filed: Jul. 7, 2017

(86) PCT No.: PCT/US2017/041016
§ 371 (c)(1),
(2) Date: Jan. 7, 2019

(87) PCT Pub. No.: WO2018/009741
PCT Pub. Date: Jan. 11, 2018

(65) Prior Publication Data
US 2019/0302286 A1  Oct. 3, 2019

Related U.S. Application Data

(60) Provisional application No. 62/359,720, filed on Jul. 8, 2016.

(51) Int. Cl.
*G01V 1/00* (2006.01)
*G01V 3/08* (2006.01)
*G01V 3/16* (2006.01)

(52) U.S. Cl.
CPC ............... *G01V 1/006* (2013.01); *G01V 3/08* (2013.01); *G01V 3/16* (2013.01); *G01V 2210/167* (2013.01)

(58) Field of Classification Search
CPC ........... G01V 1/006; G01V 3/08; G01V 3/16; G01V 2210/167; G01V 1/003
See application file for complete search history.

(56) References Cited

U.S. PATENT DOCUMENTS 4,359,766 A * 11/1982 Waters .................. G01V 1/301
367/38
4,476,552 A * 10/1984 Waters .................. G01V 1/003
367/56

(Continued)

FOREIGN PATENT DOCUMENTS

EP      3482232 A1 *  5/2019 ............ G01V 1/003
RU      2750092 C2 *  6/2021

(Continued)

OTHER PUBLICATIONS

Denes Vigh, Jerry Kapoor, Nick Moldoveanu, Hongyan Li, Breakthrough acquisition and technologies for subsalt imaging, Geophysics Sep.-Oct. 2011, vol. 76, No. 5, pp. WB41-WB51.
International Search Report and Written Opinion issued in the related PCT Application PCT/US2017/041016, dated Oct. 18, 2017.
Office Action Issued in RU Application 2019103392, dated Sep. 7, 2020 (14 pages).

(Continued)

*Primary Examiner* — Daniel Pihulic
(74) *Attorney, Agent, or Firm* — Fletcher Yoder, P.C.

(57) ABSTRACT

A long offset land seismic survey spread includes a plurality of sensors within an area thereby defining a sensor receiver patch, a plurality of long offset sensor receivers outside of the receiver patch thereby surrounding the receiver patch and defining a sensor long offset area that is fee from sensor receivers that also defines a distance separating an external border of the sensor receiver patch and the long offset sensor receivers being a minimum offset distance that is a long offset distance.

20 Claims, 2 Drawing Sheets

(56) References Cited

U.S. PATENT DOCUMENTS

| | | | |
|---|---|---|---|
| 4,930,110 A | 5/1990 | Bremner et al. | |
| 4,933,912 A | 6/1990 | Gallagher | |
| 5,109,362 A * | 4/1992 | Berni | G01H 9/00 356/487 |
| 5,787,051 A | 7/1998 | Goodway et al. | |
| 2014/0078865 A1* | 3/2014 | Coste | G01V 1/003 367/77 |
| 2015/0219790 A1 | 8/2015 | Gateman et al. | |
| 2016/0025874 A1* | 1/2016 | Hollis | G01V 1/288 367/37 |
| 2016/0097870 A1* | 4/2016 | Routh | G01V 1/003 703/2 |
| 2016/0178775 A1* | 6/2016 | Moldoveanu | G01V 1/3808 367/20 |
| 2016/0187514 A1 | 6/2016 | Dellinger | |
| 2017/0205520 A1* | 7/2017 | Moldoveanu | G01V 1/3843 |
| 2019/0302286 A1* | 10/2019 | Moldoveanu | G01V 3/16 |
| 2020/0333484 A1* | 10/2020 | Moldoveanu | G01V 1/005 |

FOREIGN PATENT DOCUMENTS

| | | |
|---|---|---|
| WO | 2015195939 A1 | 12/2015 |
| WO | 2016064845 A1 | 4/2016 |
| WO | WO-2018009741 A1 * 1/2018 ............. G01V 1/003 |

OTHER PUBLICATIONS

Office Action issued in EP Patent Application No. 17824943.9 dated Mar. 11, 2021, 8 pages.
Decision of Grant issued in RU application 2019103392, dated Apr. 26, 2021 (14 pages).
International Preliminary Report on Patentability issued in the related PCT Application PCT/US2017/041016, dated Jan. 8, 2019 (11 pages).
Extended European Search Report for EP Application No. 17824943.9-1001 dated Feb. 14, 2020.
Plessix, Rene-Edouard et al., Full Waveform Inversion and Distance Separated Simultaneous Sweeping: A Study with a Land Seismic Data Set, Geophysical Prospecting, Jul. 1, 2012, pp. 733-747, vol. 60.

* cited by examiner

ACQUISITION OF ULTRA-LONG OFFSET SEISMIC DATA FOR FULL WAVEFORM INVERSION DURING SEISMIC LAND ACQUISITION

RELATED APPLICATIONS

The present application relates to, claims priority to, and incorporates fully herein by reference, earlier filed U.S. Provisional Patent Application No. 62/359,720 that was filed on Jul. 8, 2016.

TECHNICAL FIELD

The present application relates to seismic surveys and long offset sensing with implementation of land nodes.

BACKGROUND

The following description is provided to assist the understanding of one skilled in the art, and is not meant in any way to unduly limit any claims in or relating to this specification.

Seismic surveying involves inputting a signal (e.g., vibration or impulsive) into the Earth so that the signal reflects and reverberates upon encountering various features of the Earth's formation. Sensors are used to detect the reflections and reverberations, and those are measured and become traces and/or data that is recorded. The data can be processed and otherwise manipulated and analyzed to provide information about the Earth's formation. That information can indicate a presence or lack thereof of various mineral deposits such as hydrocarbons, and other features that are of interest.

The inputted signal is often created by large machines called land vibrators. They are mobile vehicles that have a large plate that moves up and down and impacts the earth to crate vibratory signals that travel into the earth. Of course, other sources are possible, such as explosives.

Seismic data acquisition can be conducted on land by placing sensors on the ground and/or near the surface of the ground (even buried or partially buried), those sensors being either physically unconnected from one another (thus being nodal), or being cabled together (thus being cabled). Most often, for surveying large areas of land, cabled sensors are economical and are used, and this is particularly the case of wide open and clear areas such as those in the Middle East and similar areas. Of course, nodal sensors can be used entirely, or partially. Nodal sensors can communicate wirelessly with a central recording station to communicate quality control information and/or seismic information. Data can also be stored on the nodes for later removal. The survey areas can be different sizes, but are often in the magnitude of square kilometers and can contain hundreds of thousands of individual sensors.

Full waveform inversion (FWI) is a seismic inversion method that can be used to derive an Earth model from seismic data. FWI technology can enable inversion for compressional velocities (Vp) and some anisotropic parameters, such as Thompson's parameters (epsilon and delta). Long offset data (such as more than 15 km) or ultra-long offset data (such as more than 20 km) and very low frequencies (such as less than 3 Hz) can be used for FWI to generate useable velocity models.

Acquisition of long and ultra-long offset seismic data can be problematic on land because of the distance from the survey area that the sensors should be placed. For example, even if the survey area is free and clear, it is not guaranteed that the surrounding area kilometers away is free and clear in the same way.

With those issues in mind, the present specification presents representative embodiments that are disclosed herein addressing some of those issues.

SUMMARY

The following summary of various combinations of embodied features in the present specification is meant to help the understanding of one skilled in the art, and is not meant in any way to unduly limit the interpreted scope of claims recited herein or any other claims in related application.

The present specification includes a method of performing a land seismic survey including placing a plurality of seismic receivers within an area that defines the receiver patch, placing a plurality of sources in an area that defines the source patch, and placing additional receivers outside the receiver and source patches, at a distance that defines the required long offset. These receivers (nodes) placed at the required long offset from the source path are called long offset nodes (LON).

During a seismic survey, several receiver patches and source patches can be deployed to cover the survey area. The LONs will be placed around each source and receiver patch at the same distance to maintain the constant long offset during the survey. Small deviations can be accepted from the desired maximum offset to accommodate the obstacle and restricted areas.

The present specification also includes a long offset land seismic survey spread having a number of seismic sensors within an area thereby defining a sensor receiver patch, a number of long offset seismic sensors outside of the receiver patch thereby surrounding the receiver patch and defining a long offset sensor area, wherein the area between the long offset sensor area and the receiver patch define therebetween an area that is fee from seismic sensors and also that defines a long offset distance.

BRIEF DESCRIPTION OF THE DRAWINGS

The following brief description of the drawings is meant to help the understanding of one skilled in the art when reviewing the present specification and is not meant in any way to unduly limit or affect claims in the present specification or other subsequent related specifications.

DESCRIPTION

The following description is intended to help the understanding of one skilled in the art regarding various combinations of embodied features described herein the present specification, but is not intended in any way to unduly limit the claims in the present specification, or any other related application specifications.

Full Waveform Inversion (FWI) is a seismic inversion method used to derive an earth model from seismic data. FWI technology allows inverting for compressional velocities (Vp), shear wave velocities (Vs), density (rho) and some anisotropic parameters, for instance, Thompson's parameters (epsilon and delta). Long offset data (more than 10 km or ultra-long offset data (more than 15 km) can be used for FWI to generate accurate velocity models with less constrain on the initial velocity model and on the low frequency content. Acquisition of long offset land seismic data can be expensive, as it requires very large shot patches around the receiver patches. Per various embodiments in the present specification, land nodes are used that record seismic data during a traditional land acquisition. The land survey can be acquired with a cable system or with a node system. To differentiate between regular nodes that are part of the receiver spread and the nodes used for long offset acquisition, herein the nodes used for long offset acquisition are called long-offset nodes (LON) or sometimes long offset seismic sensors and/or receivers.

Figure 1:
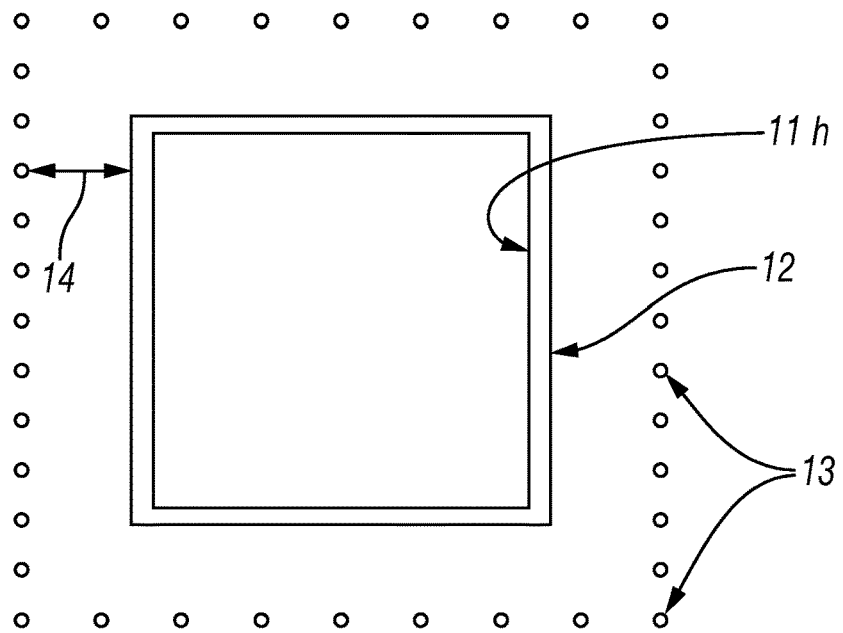
FIG. 1 is a top view schematic of a seismic sensor patch and source patch with LONs around the patches.

A number of LON (reduced compared to the sensors in the receiver patch) can be deployed adjacent to and/or around or surrounding the shot patch at desired minimum offset distances, as shown in FIG. 1, and record the generated shots. After one shot patch is acquired, the LON may be picked up and moved to the location of a second shot patch and deployed at desired minimum offsets, as shown in FIG. 2.

FIG. 1 shows long offset nodes (LON) 13 deployed around the shot patch 12 at the required minimum offset 14. Inside the shot patch 12 is the receiver patch 11 that is defined by the seismic sensors (receivers) being placed in that area. In FIG. 1, the areas are shown as being rectangular, but other shapes are possible such as squares, round, oval or other shapes.

Figure 2:
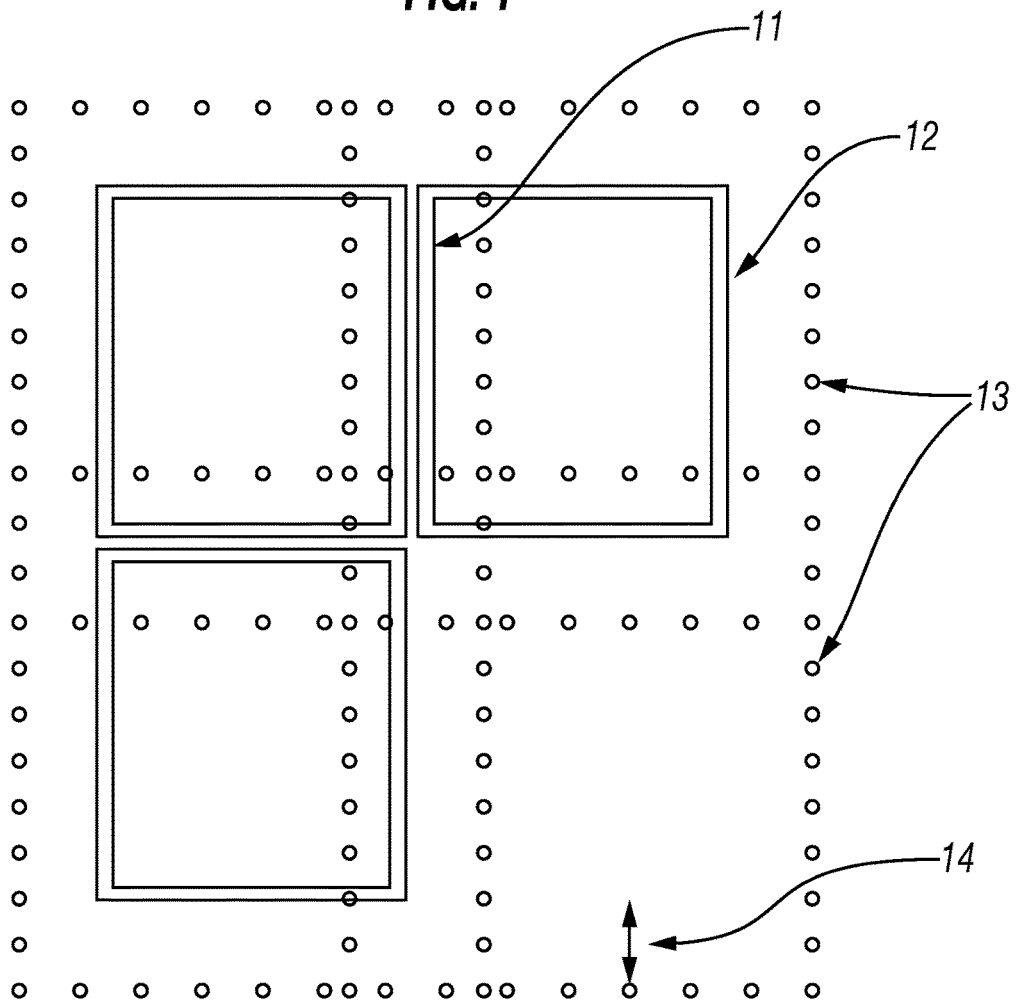
FIG. 2 is a top view schematic of multiple source and receiver patches with LONs around each source and receiver patch.

FIG. 2 shows a schematic of four acquisitions as that described in FIG. 1. The long offset nodes (LON) 13 are deployed around each shot patch 12 at the required minimum offset 14. FIG. 2 illustrates four successive patterns of acquisition with shot patches 12, receiver patches 11, and the associated long offset nodes 13. In practice, one survey is completed, then the receiver patche 11, shot patche 12, and LON 13 are moved to an adjacent position from the prior acquisition and another acquisition is performed.

To determine the locations and the number of LON 13 needed to perform an acquisition, the following information or combinations thereof may be used or generated: generate a 3D velocity model and a density model using available information including existent seismic data, VSP and log data, information about the target horizons in the area (shallow and deep horizons), positioning information for the proposed land acquisition; 3D ray tracing information, illumination of the target horizons for different offset ranges, 3D finite difference modeling using all shots and optimum location of the LON 13 derived from ray tracing, use reciprocity in modeling to reduce the computational time for 3D finite difference modeling (common receiver gathers), and FWI on common receiver gathers data and determine if the long and ultra-long offset provides the information required to derive an accurate velocity model.

The number of LONs should be large enough to assure that the long offset data could generate a good velocity model and a good subsurface image. The number of LONs is determined based on seismic simulation, as was described above.

Deployment of LON 13 is of concern. A scenario can be if the survey area is free and clear of obstructions and/or is easily accessible. However, the surrounding area may not share that trait. Such can be where a field is measured, but the surrounding area is forest or other difficult terrain. Or, where the survey area is surrounded by suburban areas where laying cabled systems is not practical, and even walking or driving into those survey areas is not practical.

The present specification discloses a combination of features where the LON (nodes that are placed outside the survey area in a long offset position) are delivered to the long offset locations by way of autonomous flying systems, sometimes referred to as drones. One such embodiment is where a drone can have propellors that lift the flying device, and the seismic sensor is either carried by the fluing device, or is incorporated thereinto. A useful design for the vehicle is shown and discussed in co-owned patent application publication no. US 2014-0078865 entitled Seismic Acquisition System-Based Unmanned Airborne Vehicle, which is referenced here and hereby incorporated by reference in its entirety for providing support for disclosure in the present specification.

Per embodiments of the present application, the LON 13 nodes can be incorporated into or be unmanned airborne vehicles that travel from a starting location to their long offset positions so that the area near the long offset positions does not need to be traversed by human operators on foot or by vehicle. The unmanned airborne vehicles with the sensors land on the ground thereby placing the sensor on the ground, detect the signals, and then the sensors are moved from the long offset locations. The unmanned airborne vehicles can also drop the LON from the vehicle thereby impacting and coupling to the Earth's surface.

Figure 3B:
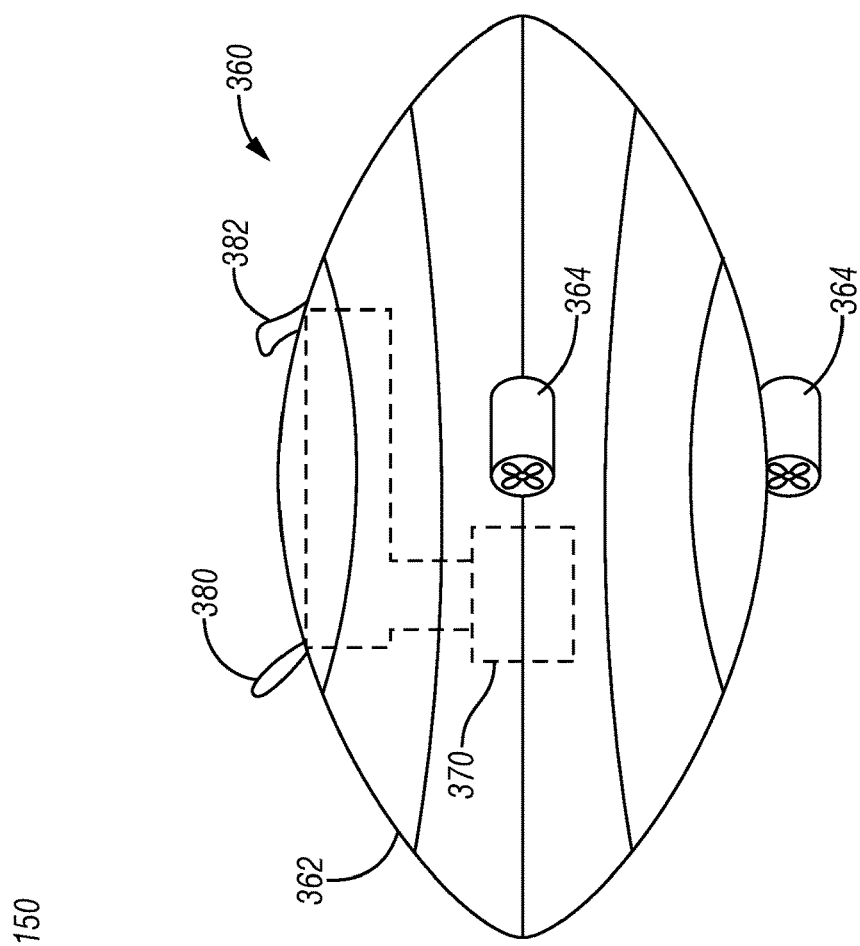
FIG. 3B is a schematic view of a drone for delivery and use in connection with a LON seismic survey.
Figure 3A:
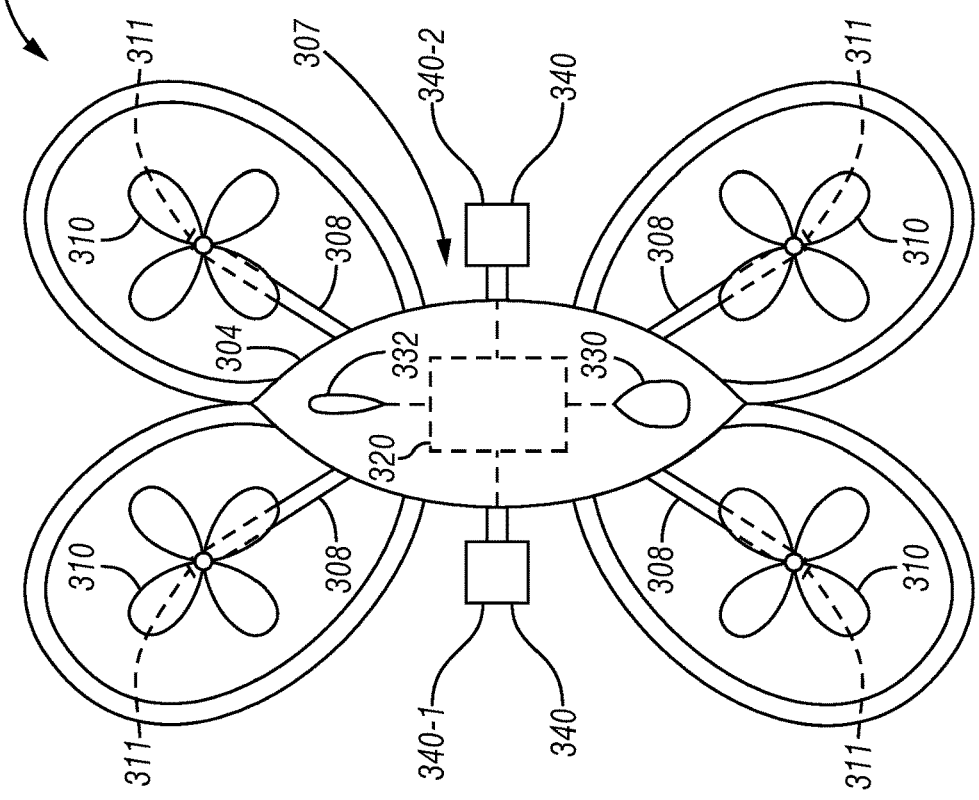
FIG. 3A is a schematic view of a drone for delivery of sensors and use in connection with a LON seismic survey.

Referring to FIG. 3A, the unmanned airborne vehicle 150 may contain multiple propellers 310 that are driven by corresponding engines 311 (electric motors, for example) of the vehicle 150 for purposes of controlling the vertical lift and/or lateral movement of the vehicle 150. In general, the unmanned airborne vehicle 150 may include a body 307 and extensions 308 from the body 307 to position the engines 311 and propellers 310, as shown in FIG. 3A. The unmanned airborne vehicle 150 may further include control electronics 320, which may, for example, autonomously control guiding the vehicle 150 along a predetermined flight path; harvesting seismic sensor data; acquiring seismic sensor data; wireless communicating of data to and from the vehicle 150, such as wireless communication to and from the vehicle 150 using Wi-Fi communication; controlling video or still image capture using high definition (HD) cameras 340 (two HD cameras 340-1 and 340-2, for example) and their associated motors; and so forth. As depicted in FIG. 3A, the control electronics 230 may be coupled to a GNSS antenna 330 for purposes of receiving GNSS signal that are encoded with data indicative of the vehicle's location as well as a Wi-Fi antenna 332 for Wi-Fi communication.

In accordance with example implementations, the unmanned airborne vehicle 150 may be a vehicle similar to the AR Drone, which is available from Parrot™.

The unmanned airborne vehicle may take on other forms, in accordance with further implementations. For example, FIG. 3B depicts an unmanned airborne vehicle 360, which achieves its vertical lift using buoyancy achieved from a lighter than air gas that is stored inside a body 362 of the vehicle 362. In this regard, the body 362 may contain a bladder or balloon that is filled with helium, in accordance with an example implementation. In general, lateral maneuvering of the unmanned airborne vehicle 360 as well as controlled vertical positioning may be achieved using, for example, propeller-based thrusters 364 (distributed below and on both sides of the body 362, for example) and wings/rudders (not shown), which are controlled by control electronics 370 of the vehicle 360. Similar to the unmanned airborne vehicle 150 of FIG. 3A, control electronics 370 may control operation of the unmanned airborne vehicle 360 and its communication. Among its other features, as depicted in FIG. 3B, the unmanned airborne vehicle 360 may contain a GNSS antenna 380, as well as a Wi-Fi antenna 382.

The preceding description is covers a non-exhaustive number of combinations of embodiments intended to be within the scope of the present specification, and with that in mind, is not meant to unduly limit the scope of claims in this specification, or other subsequent and related claims in specifications.

What is claimed is:

1. A method of performing a land seismic survey, comprising:
    placing a plurality of seismic sensor receivers around a perimeter of an area, thereby establishing a seismic sensor receiver patch;
    defining a plurality of seismic source points outside the perimeter, thereby establishing a seismic source patch surrounding the seismic sensor receiver patch; and
    placing a plurality of long offset seismic sensors (LONs) outside of the seismic sensor receiver patch and the seismic source patch at a required long offset distance.

2. The method of claim 1, wherein the long offset distance is at least 10 kilometers from each of the plurality of LONs to the seismic source patch.

3. The method of claim 1, wherein the long offset distance is at least 15 kilometers from each of the plurality of LONs to the seismic source patch.

4. The method of claim 1, wherein the long offset distance is at least 20 kilometers from each of the plurality of LONs to the seismic source patch.

5. The method of claim 1, comprising:
    activating a seismic source in the seismic source patch to generate a seismic source signal;
    receiving and recording reflections and reverberations of such source signal via at least one of the plurality of LONs;
    performing full waveform inversion on common receiver gathers data;
    determining if the plurality of LONs provides information required to derive an accurate velocity model; and
    based on results of the full waveform inversion, deciding if a plurality of locations of the plurality of LONs with respect to a location of the seismic source patch is adequate for full waveform inversion.

6. The method of claim 2, comprising placing the plurality of LONs by way of unmanned airborne vehicles.

7. The method of claim 6, wherein the unmanned airborne vehicles each have thereto connected a respective LON of the plurality of LONs that is placed by landing the unmanned airborne vehicles on the Earth's surface, thereby coupling the respective LON to the Earth's surface.

8. The method of claim 6, wherein the unmanned airborne vehicles each have thereto connected a respective LON of the plurality of LONs that is placed by dropping the respective LON into the Earth's surface.

9. A long offset land seismic survey spread, comprising:
    a number of seismic sensor receivers disposed around a perimeter of an area thereby defining a seismic sensor receiver patch;
    a number of seismic sources outside the perimeter thereby surrounding the seismic sensor receiver patch and defining a seismic source patch; and
    a number of long offset seismic sensors (LONs) outside of the seismic source patch thereby surrounding the seismic sensor receiver patch and the seismic source patch and defining a long offset sensor area, wherein an area between the long offset sensor area and the seismic sensor receiver patch is free from seismic sensor receivers and defines a long offset distance.

10. The long offset land seismic survey spread of claim 9, wherein the long offset distance is at least 10 kilometers, with no seismic sensor receivers from the seismic sensor receiver patch or each of the number of long offset seismic sensors being in the area traversed by and defining the long offset distance.

11. The long offset land seismic survey spread of claim 9, wherein each of the long offset seismic sensors is adapted to be connected to an unmanned flying vehicle.

12. The long offset land seismic survey spread of claim 9, wherein the long offset distance is at least 15 kilometers, with no seismic sensor receivers from the seismic sensor receiver patch or each of the number of long offset seismic sensors being in the area traversed by and defining the long offset distance.

13. The long offset land seismic survey spread of claim 9, wherein the long offset distance is at least 20 kilometers, with no seismic sensor receivers from the seismic sensor receiver patch or each of the number of long offset seismic sensors being in the area traversed by and defining the long offset distance.

14. The method of claim 1, wherein the plurality of LONs are determined based on seismic simulation using full finite difference modeling to generate synthetic data and to run full waveform inversion.

15. The long offset land seismic survey spread of claim 9, comprising a controller configured to:
    activate at least one seismic source of the number of seismic sources to generate a seismic source signal;
    receive reflections and reverberations of the seismic source signal via at least one of the number of LONs;
    perform full waveform inversion on common receiver gathers data;
    determine if a collection of data acquired from each the number of long offset sensors provides information required to derive an accurate velocity model; and
    based on results of the full waveform inversion, decide if a first location of each of the number of LONS with respect to a second location of the seismic source patch is adequate for performing the full waveform inversion.

16. A long offset land seismic survey spread, comprising:
    a number of seismic sensors within an area thereby defining a sensor receiver patch;
    a number of seismic sources within an area thereby defining a source patch; and
    a number of long offset seismic sensors (LONs) outside of the source patch thereby surrounding the sensor receiver patch and the source patch and defining a long offset sensor area, wherein an area between the long offset sensor area and the sensor receiver patch is free from seismic sensors and also that defines a long offset distance, wherein the long offset distance is at least 10 kilometers, with no seismic sensor receivers from the sensor receiver patch or one or more of the number of long offset seismic sensors being in the area traversed by and defining the long offset distance.

17. The long offset land seismic survey spread of claim 16, wherein the long offset distance is at least 15 kilometers.

18. The long offset land seismic survey spread of claim 16, wherein the long offset distance is at least 20 kilometers.

19. The long offset land seismic survey spread of claim 16, comprising a controller configured to:
  activate at least one seismic source of the number of seismic sources to generate a seismic source signal; and
  receive seismic data associated with the seismic source signal via at least one of the number of LONs.

20. The long offset land seismic survey spread of claim 19, wherein the controller is configured to generate a velocity model based on the seismic data.

* * * * *